Figures 1, 2:
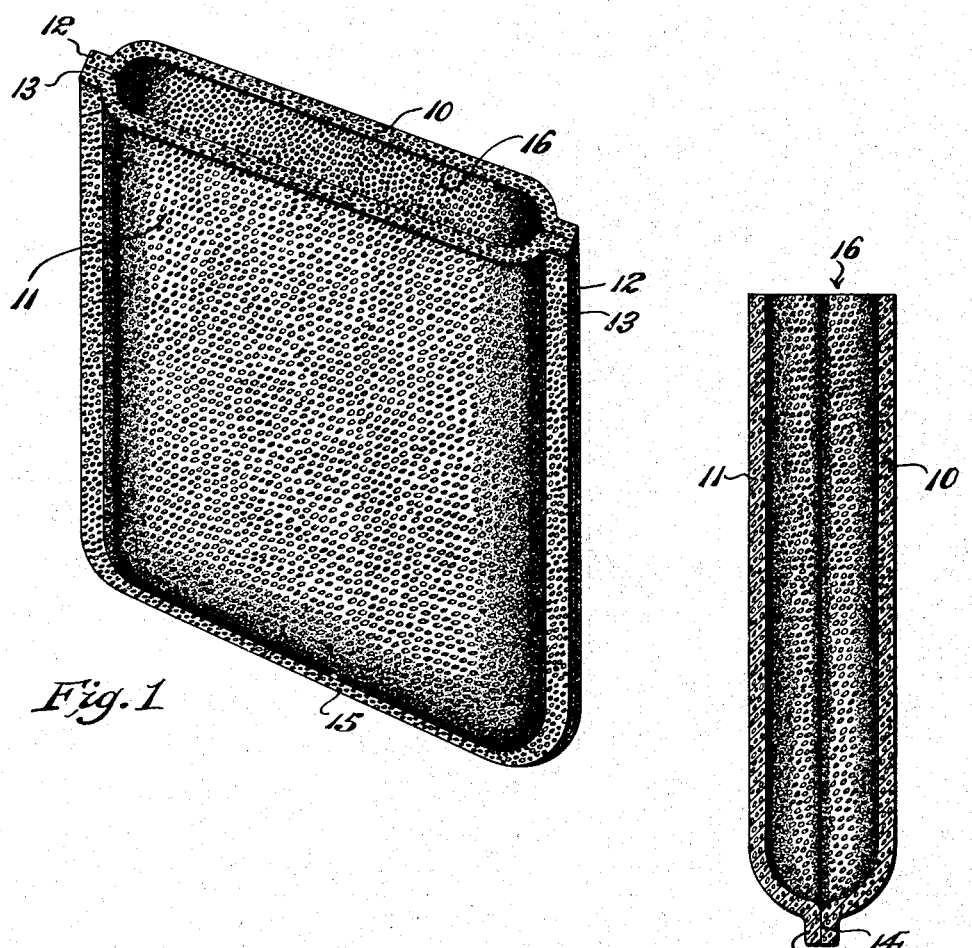

May 1, 1945.  L. A. KISCH  2,374,755

FILTER AND STRAINER MEDIUM

Filed Nov. 24, 1943

INVENTOR.
Louis A. Kisch,
BY George S. Richards
ATTORNEY.

Patented May 1, 1945

2,374,755

UNITED STATES PATENT OFFICE 2,374,755

FILTER AND STRAINER MEDIUM

Louis A. Kisch, Little Falls, N. J., assignor to Metal Textile Corporation, West Orange, N. J., a corporation of Delaware Application November 24, 1943, Serial No. 511,539

1 Claim. (Cl. 210—190)

This invention relates, generally, to a filter or strainer medium, and to devices made therefrom adapted for separating suspended solids from fluids passed therethrough, whereby to clarify and cleanse the fluids.

The invention has for an object to provide a novel filter or strainer medium composed of artificial or cellulose sponge material, whereby to provide a foraminous filtering or straining barrier of highly ramified interstitial structure which, although readily permeable by a fluid or a liquid, will efficiently function to arrest movement therethrough of any solids suspended in the fluid or liquid.

This invention has for another object to provide a filtering or straining unit in the form of a bag-like member, the walls of which are formed from sheet cellulose sponge material permeable to flow of liquid therethrough, but efficiently obstructive to movement of solid particles therethrough.

An illustrative embodiment of filtering or straining unit of bag-like form and made of cellulose sponge material is shown in the accompanying drawing, in which:

Fig. 1 is a perspective view of a bag-like unit made of sheet cellulose sponge; and Fig. 2 is a vertical cross sectional view thereof.

The method of forming artificial or cellulose sponge from viscose ordinarily comprises mixing with a predetermined quantity of viscose from green or unripened alkali cellulose a suitable amount of fibrous reenforcing material together with a suitable quantity of pore forming material, such as sodium sulfate decahydrate, and thereupon coagulating or regenerating the mass thus formed and finally evacuating the pore material. The pore size of the resultant artificial sponge mass is governed by the size of granules or particles of the pore forming material utilized, and consequently masses or sheets of cellulose sponge may be optionally obtained having any desired pore size ranging from very fine to very coarse. Furthermore, by using pore forming material of selected uniform size, the porosity of the cellulose sponge may be of substantially uniform size throughout the sponge mass. Since the cellulose sponge material is easily produced in mass or sheets of uniform selected thickness, and of desired substantially uniform pore size, said material provides a foraminous mass of highly ramified but substantially uniform interstitial structure; the areas of the porous external face surfaces of which lie in flat and comparatively smooth planes.

I have found that by reason of the described internal and external structure thereof, a mass or sheet of cellulose sponge material provides a highly efficient filtering or straining medium, which may be variously provided in selected pore size and in selected mass or sheet thickness best adapted to the straining or filtering of given fluids, or liquids of given viscosity, containing suspended solids desired to be separated and removed therefrom. By reason of the comparatively smooth face areas of the cellulose sponge mass or sheet, when the same is used as a straining or filtering medium the major part of the suspended solid content of a fluid or liquid, when the latter is caused to pass therethrough substantially perpendicular to a face plane thereof, is arrested at the face surface with minimum tendency to penetrate the interior of the mass or sheet, and furthermore the accumulations of thus arrested solids, by their own weight and under agitation by flux of the fluid or liquid, quickly tend to drop away from the face surface of the mass or sheet, whereby, to a noticeable degree, the straining or filtering medium formed by the cellulose sponge mass or sheet is self-cleaning, especially when said face surface is disposed in substantially vertical plane. Due to the highly ramified interstitial internal structure of the cellulose sponge medium, any solid particles which succeed in passing the external surface thereof are quickly trapped in the internal interstices, and thus arrested before likelihood of escape beyond the opposite or discharge face thereof.

The cellulose sponge material in sheet form is especially well adapted for the production therefrom of bag-like strainer or filter units capable of being suspended for passage of a fluid or liquid desired to be cleansed through its walls, either from the outside in or from the inside out. As shown in the drawing, such bag-like form of strainer or filter unit may be produced by superposing sheets of cellulose sponge material of suitable thickness to form side walls 10 and 11 having their respective side marginal portions 12 and 13 and their common end marginal portions 14 and 15 registered together in face of face contact, thus forming a bag-like structure having an open mouth end 16. The registered and contacting marginal portions of the side walls are suitably secured together. This may be done by cementing the same one to the other, utilizing a cement or glue which is insoluble in the particular fluid or liquid for which the unit is to be used, or said marginal portions may be stitched or stapled together or otherwise mechanically joined.

A bag-like strainer or filter unit, such as above desribed, is very well adapted for use in filtering or straining devices such as disclosed in a co-pending application for Letters Patent filed by me jointly with Alfred M. Goodloe Ser. No. 511,540, wherein the bag-like unit would be expanded by an inserted open work frame as disclosed in said co-pending application. When used in such connection, the readily compressible character of the cellulose sponge material renders the same especially well adapted to provide a seating and sealing lip portion when the frame backed mouth of the bag-like unit is held tightly thrust home against the supporting structure of the filtering or strainer devices.

It will be obvious however that, in the broader aspects of this invention, the specific form of the straining or filtering unit composed of artificial or cellulose sponge material is subject to wide variation according to the specific type and construction of strainer or filter device in which it is desired to be employed as the straining or filtering medium.

It will also be understood that the artificial or cellulose sponge medium of this invention may be used both in air or gas filtering devices as well as in liquid straining devices.

Having now described my invention, I claim:

A strainer unit comprising a bag-like formation composed of superposed sheets of cellulose sponge, said sheets having their marginal portions at one end and their side marginal portions secured together in face to face meeting relation, the body portions of said sheets which are bounded by said meeting marginal portions being respectively outwardly bowed in mutually laterally offset relation to provide an interior hollow chamber therebetween, said cellulose sponge sheets being of substantially uniform thickness and of substantially uniform porosity

LOUIS A. KISCH.